United States Patent [19]
Johnson

[11] Patent Number: 5,755,091
[45] Date of Patent: May 26, 1998

[54] REGENERATIVE PISTON ENGINE FOR COMBUSTION OF LIQUID MONOPROPELLANT

[75] Inventor: Darrin L. Johnson, Fountain Hills, Ariz.

[73] Assignee: Autoliv ASP, Inc., Ogden, Utah

[21] Appl. No.: 768,146

[22] Filed: Dec. 17, 1996

[51] Int. Cl.$^6$ ..................................... F02K 9/44
[52] U.S. Cl. ........................... 60/204; 60/259
[58] Field of Search .................. 60/39.76, 39.81, 60/204, 247, 259, 39.462

[56] References Cited

U.S. PATENT DOCUMENTS

| | | | |
|---|---|---|---|
| 3,479,818 | 11/1969 | Strobl | 60/259 |
| 3,690,255 | 9/1972 | Vass et al. | 102/39 |
| 3,889,703 | 6/1975 | Keathly | 137/67 |
| 3,893,294 | 7/1975 | Bruun et al. | 60/39.46 |
| 4,069,664 | 1/1978 | Ellion et al. | 60/258 |
| 4,100,836 | 7/1978 | Hofmann | 89/7 |
| 4,258,546 | 3/1981 | Stratton | 60/259 |
| 4,269,107 | 5/1981 | Campbell, Jr. | 89/7 |
| 4,326,377 | 4/1982 | Jaqua | 60/247 |
| 4,722,185 | 2/1988 | Campbell | 60/259 |
| 4,805,399 | 2/1989 | McKevitt | 60/200.1 |
| 5,060,973 | 10/1991 | Giovanetti | 280/736 |
| 5,291,731 | 3/1994 | Duva | 60/39.6 |
| 5,481,977 | 1/1996 | Evans et al. | 102/328 |
| 5,487,561 | 1/1996 | Mandzy et al. | 280/741 |
| 5,639,117 | 6/1997 | Mandzy et al. | 280/741 |

Primary Examiner—Louis J. Casaregola

[57] ABSTRACT

A regenerative liquid propellant engine system includes a body having opposed ends. A combustion chamber is disposed in the body. A reservoir of liquid propellant is also disposed in the body. A regenerative piston is slidably disposed in the body for delivering the liquid propellant to the combustion chamber. When combustion occurs in the combustion chamber the piston is driven into the liquid propellant reservoir and the liquid propellant is injected into the combustion chamber to produce combustion products. A storage tank stores a quantity of liquid propellant and a pump delivers the liquid propellant from the storage tank to the liquid propellant reservoir. The regenerative piston produces the necessary pumping pressure to operate the pump, thus, the mechanical complexity and inefficiencies of other pumping techniques is avoided.

9 Claims, 2 Drawing Sheets

_5,755,091_

REGENERATIVE PISTON ENGINE FOR COMBUSTION OF LIQUID MONOPROPELLANT

This application is related to copending applications Ser. No. 08/770,380, entitled "Injection Termination Feature"; Ser. No. 08/770,380,"Anti-Rupture Method For Liquid Propellant Gas Inflator"; Ser. No. 08/781,760, entitled "Liquid Propellant Inflator Having a Crowned Encapsulation and a Pre-formed Regenerative Piston Chamber"; Ser. No. 08/760,011, entitled "Regenerative Piston Liquid Propellant Rocket Motor"; Ser. No. 08/802,457, entitled "Adaptive Regenerative Inflator"; Ser. No. 08/759,995, entitled "Regenerative Monopropellant Airbag Inflator"; all assigned to the assignee of the present invention.

BACKGROUND OF THE INVENTION

1. Field of the Invention

The present invention relates to a liquid monopropellant engine which can be used to convert the energy of expanding combustion products to mechanical energy, and more particularly, to an engine which incorporates a regenerative piston which provides an efficient means of pumping the liquid monopropellant into a combustion chamber for combustion.

2. Description of the Related Art

Prior art liquid propellant fueled engines often use a pumping system to inject propellant into the combustion chamber. These systems are highly mechanical and complex. U.S. Pat. No. 4,258,546 discloses a propulsion system which utilizes centrifugal force to deliver a liquid bipropellant and an oxidizer to the device. Thus, this propulsion system is limited to certain applications, namely, a fluid fueled rocket engine. Moreover, this device requires a separate source of oxygen to function.

U.S. Pat. No. 4,326,377 discloses a propellant injector for a liquid rocket engine. The rocket engine operates via a complex, multi-part piston which delivers liquid propellant from a small fuel injection chamber. The fuel injection chamber is constantly replenished from a remote source of liquid propellant. Such systems are costly and complex. Moreover, the above device utilizes a bipropellant which requires oxidation in an injector chamber.

Other technologies, for example, vehicle safety restraint systems and ammunition deployments, are also known to use regenerative liquid propellant feed systems. U.S. Pat. No. 3,690,255 discloses a controlled regenerative cycle for delivering liquid propellant for a cartridge bomb ejector. Such a device is not replenishable during use, thus, once the original supply of liquid propellant is combusted the device can no longer be used. Moreover, although the regenerative fluid delivery system is adequate for the disclosed ammunition application, means are not provided for producing the combustion necessary to produce enough thrust for space applications.

Other alternative prior art use a bulk mode delivery technique in which all of the propellant to be burned is injected at low pressure before combustion is initiated, resulting in a sudden burst of energy. However, upon combustion, the peak pressures are much higher and erratic than with the constant injection of the regenerative piston.

SUMMARY OF THE INVENTION

An object of the present invention is to provide a regenerative piston engine which produces the necessary pumping pressures directly without separate mechanical means, thus, providing the most efficient means of pumping the liquid propellant into the combustion chamber. By directly converting pressure energy from the combustion chamber into pumping energy through the hydraulic effects of the piston, the mechanical complexity and inefficiencies of other pumping techniques are eliminated.

Another object of the present invention to provide an engine whereby any common internal combustion engine technique can be used to convert the energy of the expanding combustion products to mechanical energy. Common techniques include a reciprocating piston, rotary engine or turbine engine.

A further object of the present invention is that the regenerative piston functions as an injector to inject propellant into the combustion chamber. Thus, the combustion pressure is constant or tailorable as desired and combustion pressures can be optimized.

Still another object of the present invention is to provide a device which offers very high power output with minimum working parts.

Another advantage of the present invention is an engine which does not require oxygen to function. The oxygen is contained within the liquid propellant, thus, the device can operate in an oxygen free environment without supplemental oxygen requirements. However, if combined with oxygen injection, the device can be modified to use common fuels.

In accomplishing these and other objectives of the present invention, there is provided a regenerative liquid propellant engine system including a body having opposed ends. A combustion chamber is disposed in the body. A reservoir of liquid propellant is also disposed in the body. Regenerative piston means are slidably disposed in the body for delivering the liquid propellant to the combustion chamber. When combustion occurs in the combustion chamber the piston means is driven into the liquid propellant reservoir and the liquid propellant is injected into the combustion chamber to produce combustion products. Storage means store a quantity of liquid propellant and pumping means deliver the liquid propellant from the storage means to the liquid propellant reservoir, wherein the piston means produces the necessary pumping pressure for operating the pumping means.

Other features and advantages of the present invention will become apparent from the following description of the invention which refers to the accompanying drawings.

DETAILED DESCRIPTION OF THE PREFERRED EMBODIMENTS

Figure 1:
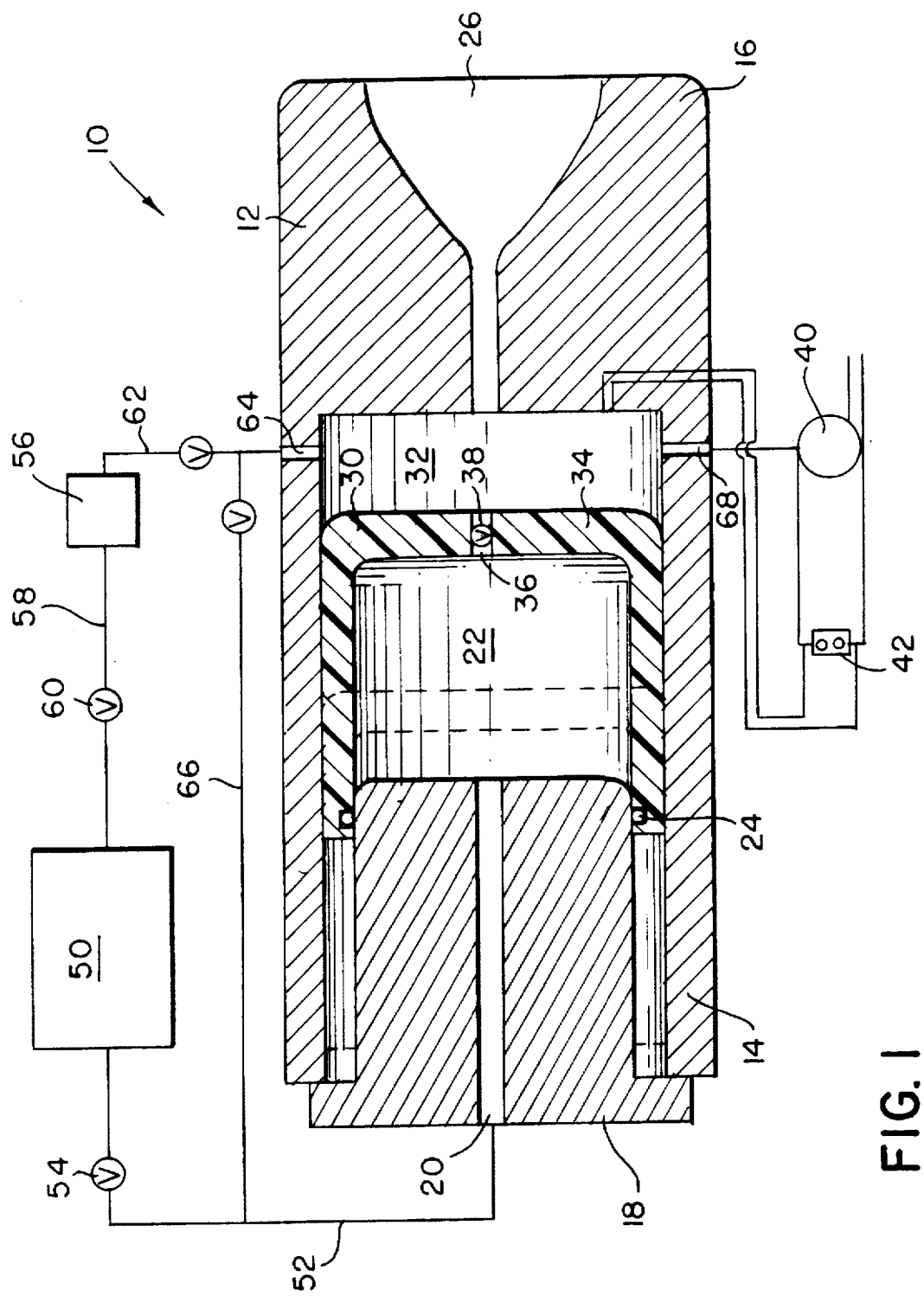
FIG. 1 is a cross-section of the regenerative piston engine of the present invention.

Referring to FIG. 1, the liquid monopropellant engine of the present invention is referred to by reference numeral 10. Engine 10 includes a body 12 having opposed ends 14, 16. Located in end 14 is an end plug 18. End plug 18 includes a central passageway 20 for delivery of the liquid monopropellant to a liquid propellant reservoir 22. Reservoir 22 is enclosed between end plug 18 and a regenerative piston 30, which will be described further herein.

As shown in FIG. 1, piston 30 is slidably disposed on end plug 18. Appropriate sealing means 24, for example, an o-ring or gasket, can be provided between end plug 18 and piston 30. Furthermore, additional sealing means can be provided between end plug 18 and body 12.

The liquid propellant is a monopropellant, for example, Hydroxyl/Ammonium Nitrate (Han/Tean), thus, the oxygen necessary to operate the engine is contained directly in the propellant and a separate oxidizing source is not required. However, due to the corrosive nature of the liquid propellant, end plug 18 and piston 30 must be made of or coated with a compatible material, for example, Teflon, or a Teflon coated metal.

Opposite end 16 of body 12 can include a converging-diverging nozzle 26 modifying the engine for use with a rocket or space vehicle device. Alternatively, other techniques can be used with the engine to convert the energy of the expanding combusted liquid propellant to mechanical energy. For example, rather than a nozzle, the gaseous by-products can be used for operating a reciprocating piston, or a rotary or turbine engine (not shown). Also, direct transfer of mechanical energy from regenerative piston 30 itself can be used.

Regenerative piston 30 separates liquid propellant reservoir 22 from a combustion chamber 32. Piston 30 is skirt shaped and includes in its face 34 at least one injection port 36. Injector 36 is designed to retain the liquid propellant at a low-pressure recharge. Thus, when the piston is being refilled after firing, the injector does not allow the propellant to leak into the combustion chamber.

The propellant is injected through port 36 at a constant rate. Piston 30 can also be a T-shaped piston having a variable injection rate, with the design of body 12 and end plug 18 being adjusted accordingly.

Communicating with combustion chamber 32 is means for sparking an initiation in chamber 32. Generator 40, driven by a gas turbine, provides the necessary charge to combust the initiate. Chamber 32 contains liquid propellant which is ignited by the electrical spark. Chamber 32 is recharged with more propellant for each ignition via line 66 and port 64.

Regenerative delivery and combustion operation of the device is as follows. Upon ignition generated heat from combustion will raise the pressure within chamber 32. A valve 38 sealing injection port 36 will open when exposed to high pressure in reservoir 22 to allow injection. Because the surface area of piston 30 facing chamber 32 is larger than the surface area of the piston facing liquid propellant reservoir 22, a pressure differential across the piston will drive the piston leftward into reservoir 22, as viewed in the drawing figure. As piston 30 is driven into the liquid propellant reservoir, an initial quantity of the liquid propellant is injected through port 36 into chamber combustion chamber 32. This initial quantity of liquid propellant combusts causing the pressure within chamber 32 to increase further. The energy generated by the combustion of the initial quantity is used to drive the piston further into the liquid propellant reservoir and additional liquid propellant is injected into the combustion chamber. This regenerative cycle continues until all of the liquid propellant in reservoir 22 has been combusted. At this point, the piston's position within body 12 is indicated by the dashed lines in FIG. 1.

The engine of the present invention includes means for pumping additional liquid propellant into the depleted reservoir. A storage tank 50 of liquid propellant communicates which passageway 20 via line 52. Line 52 includes a valve 54 which can be electronically or pressure controlled. An accumulator 56 communicates with storage tank 50 via a line 58. Line 58 includes a valve 60 which can be used to cool the gas. Line 58 and/or valve 60 can be provided with adequate heat sink fins, or any other known common cooling means, to cool the gas.

A second line 62 extends between accumulator 56 and a passage 64 which leads into combustion chamber 32. An ignition feedback line 66 extends between lines 52 and 62. Tank 50 contains the stored liquid propellant at high pressure. When valve 54 is opened, liquid propellant flows to line 52 and line 66. When line 62 is closed and line 66 is opened a small liquid propellant charge is delivered into combustion chamber 32 to start the ignition process.

Because accumulator 56 communicates with combustion chamber 32, the pressure within chamber 32 can be tapped to recharge accumulator 56. The hydraulic effects of piston 30 as described above can recharge accumulator 56 and a quantity of liquid propellant from storage tank 50 can be pumped back into reservoir 22, piston 30 is moved back into position and the entire process can be repeated. Thus, the entire device is self-contained and self-generating until the liquid propellant supply is used.

Moreover, as shown in FIG. 1, gas turbine generator 40 communicates with chamber 32 via passage 68. Like accumulator 56, capacitors and batteries 42 can be recharged via the generator 40 by tapping the pressure within combustion chamber 32. As a small amount of gas flows through line 68, it is directed to the turbine to spin the generator.

Figure 2:
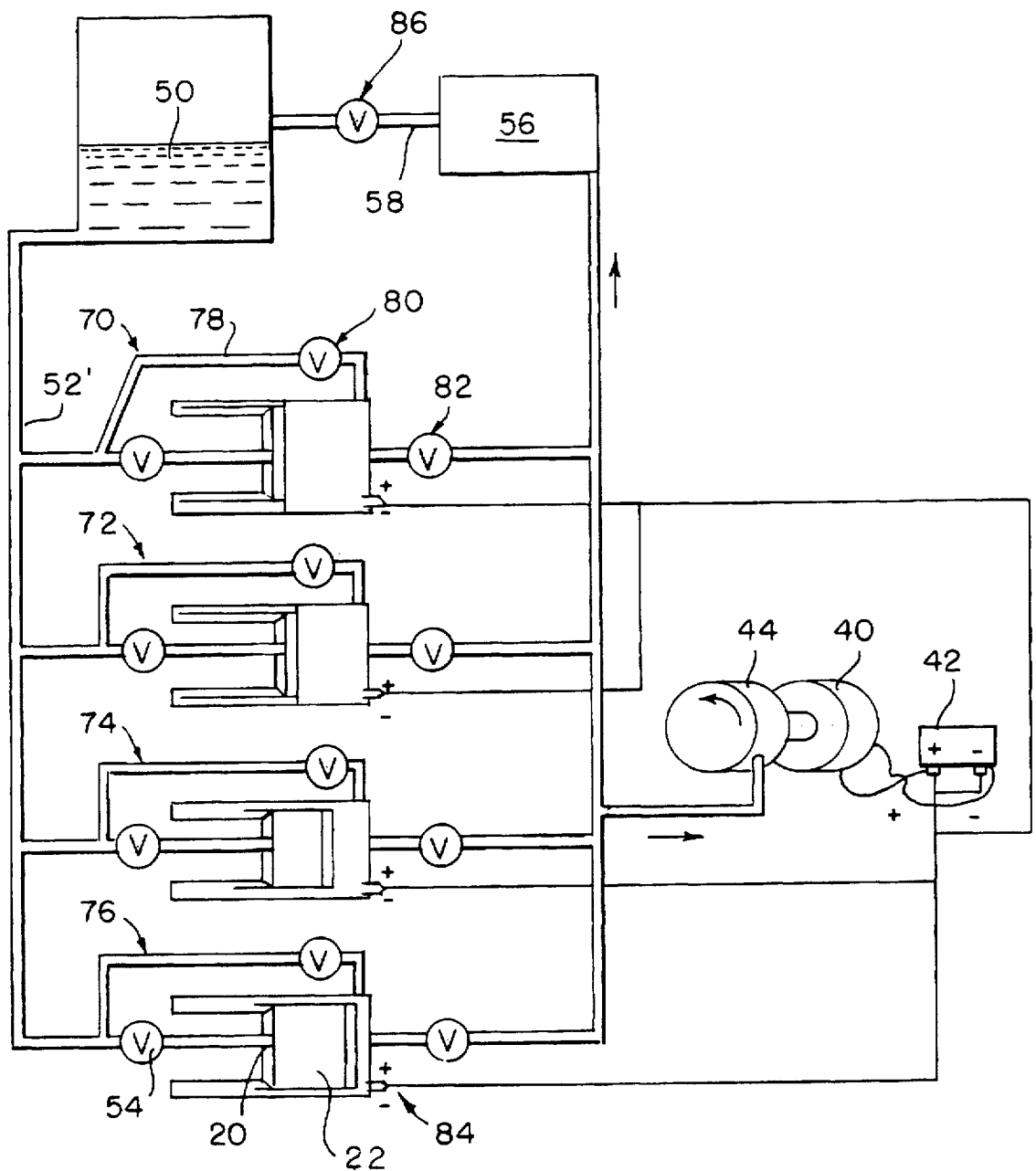
FIG. 2 is a schematic illustration of a multi-piston regenerative piston engine according to a second embodiment of the present invention.

As shown in FIG. 2, multiple regenerative pistons 70, 72, 74 and 76 can be used.. Each piston works in the same manner as described in the embodiment of FIG. 1, and wherever possible, like parts have been indicated with like numerals. Line 52' communicates with each of the piston inlets 20. Valves 54 can be opened to allow liquid propellant from storage tank 50 to be pumped by accumulator 56 into the pistons to recharge the same. Valve 86 serves to regulate the pressure in line 58. Referring to piston 70, a check valve 80 is provided in feedback line 78. Electronically controlled valve 82 functions like a check valve during piston recharge, opening for pressure feedback to start the next cycle. A spark plug 84 is provided with each of the pistons 70-76 and communicates with the battery 42.

The regenerative piston engine of the present invention has high efficiency, tailorable combustion performance and liquid monopropellant capability.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A regenerative liquid propellant engine system, comprising:

a body having opposed ends;

a combustion chamber disposed in the body;

a reservoir of liquid propellant disposed in the body;

regenerative piston means slidably disposed in the body for delivering the liquid propellant to the combustion chamber, wherein when combustion occurs in the combustion chamber the piston means is driven into the liquid propellant reservoir and the liquid propellant is injected into the combustion chamber to produce combustion products;

injection means disposed in the piston means for injecting the liquid propellant into the combustion chamber;

storage means for storing a quantity of liquid propellant;

pumping means for delivering the liquid propellant from the storage means to the liquid propellant reservoir; and a first passage disposed in the body, the pumping means communicating with the combustion chamber via the first passage.

2. The liquid propellant engine system of claim 1, further comprising an end plug having a second passageway, the end plug being disposed in one end of the body.

3. The liquid propellant engine system of claim 1, further comprising means for converting the energy of the combustion products into mechanical energy located at the other end of the body.

4. The liquid propellant engine system of claim 2, wherein the regenerative piston means comprises at least one piston slidably disposed on the end plug of the body.

5. The liquid propellant engine system of claim 2, wherein the storage means comprises a tank located outside the body of the engine, wherein the storage tank communicates with the passageway of the end plug to deliver the liquid propellant from the storage tank to the liquid propellant reservoir.

6. A regenerative liquid propellant engine system, comprising:

a body having opposed ends;

a combustion chamber disposed in the body a reservoir of liquid propellant disposed in the body;

regenerative piston means slidably disposed in the body for delivering the liquid propellant to the combustion chamber, wherein when combustion occurs in the combustion chamber the piston means is driven into the liquid propellant reservoir and the liquid propellant is injected into the combustion chamber to produce combustion products;

injection means disposed in the piston means for injecting the liquid propellant into the combustion chamber;

storage means for storing a quantity of liquid propellant; and a rechargeable accumulator for delivering the liquid propellant from the storage means to the liquid propellant reservoir.

7. The liquid propellant engine system of claim 6, further comprising a passage disposed in the body of the engine, the accumulator communicating with the combustion chamber via the passage.

8. The liquid propellant engine system of claim 1, wherein the liquid propellant is a monopropellant.

9. A method of regeneratively injecting liquid propellant into an engine system, comprising the steps of:

storing a quantity of liquid propellant in a storage means;

movably positioning regenerative piston means within a body of an engine, the body including a combustion chamber and a reservoir of liquid propellant disposed therein, the piston means including at least one injection port in a face thereof;

injecting the liquid propellant into the combustion chamber through the at least one injection port of the piston means;

combusting the liquid propellant within the combustion chamber;

driving the piston means into the liquid propellant reservoir and further injecting the liquid propellant into the combustion chamber to produce combustion products; and pumping the liquid propellant from the storage means to the liquid propellant reservoir by a rechargeable accumulator to replenish the liquid propellant reservoir.

* * * * *